Feb. 11, 1947.  H. R. FORNEY  2,415,478
TRAILER HITCH
Filed June 7, 1944
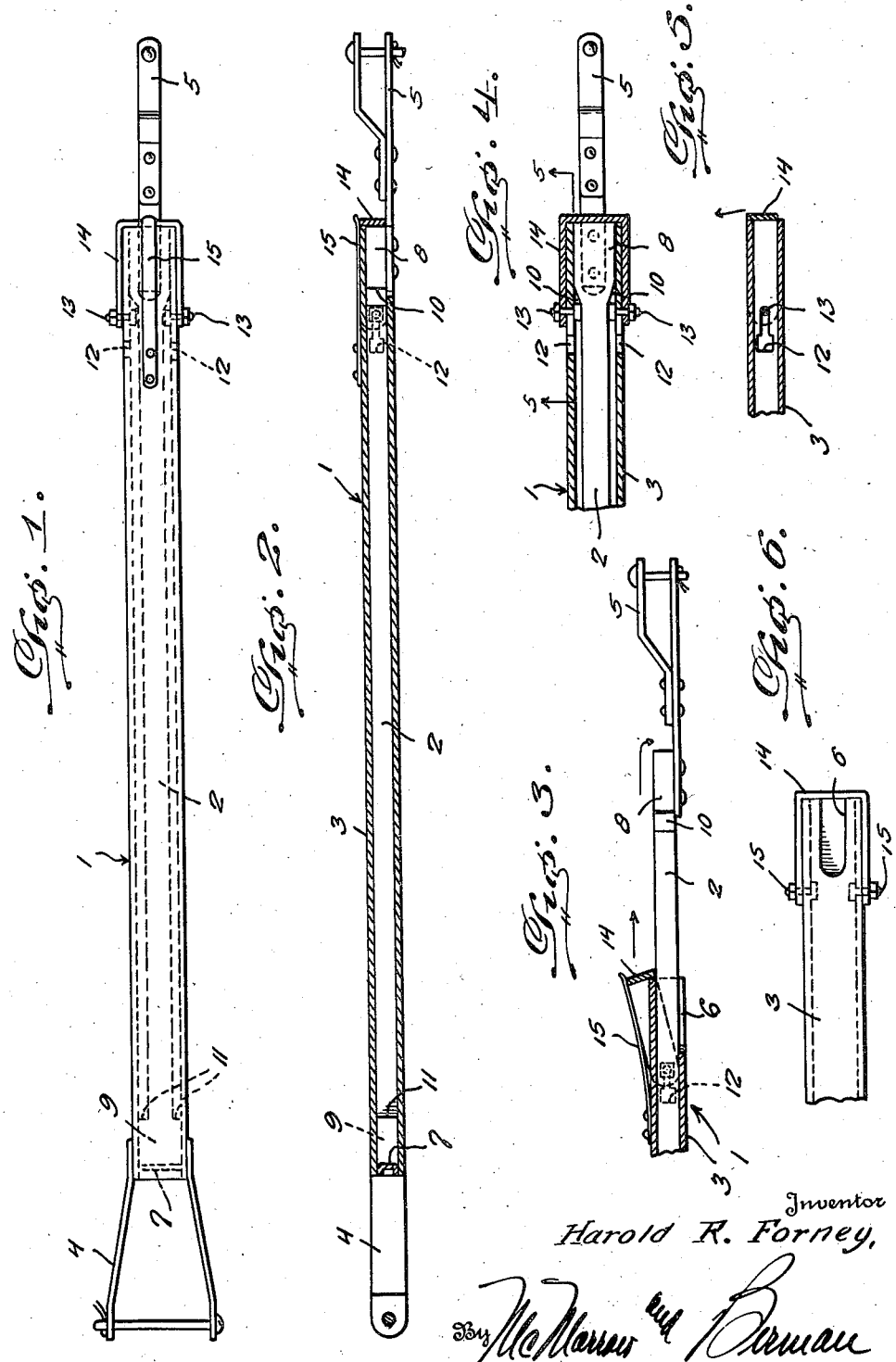
Inventor
Harold R. Forney,
By McMorrow and Berman
Attorneys Patented Feb. 11, 1947

2,415,478

UNITED STATES PATENT OFFICE 2,415,478

TRAILER HITCH

Harold R. Forney, Surprise, Nebr.

Application June 7, 1944, Serial No. 539,120

4 Claims. (Cl. 280—33.14)

This invention relates to telescopic trailer hitches of a generally similar nature to that constituting the subject matter of my United States Patent No. 2,292,751, issued August 11, 1942, upon which the present device constitutes an improvement.

The primary object of the present invention is to provide, in a manner as hereinafter set forth, an improved trailer hitch of the aforementioned character which embodies unique means for automatically locking the telescopically connected male and female members of the bar in retracted or towing position.

Other objects of the invention are to provide a trailer hitch of the character set forth which will be relatively simple in construction, strong, durable, compact, light in weight and which may be manufactured at low cost.

The foregoing and other objects and advantages of the invention will become apparent from a study of the following specification, taken in connection with the accompanying drawing, wherein like characters of reference designate corresponding parts throughout the several views, and wherein:

Figure 1 is a top plan view of a trailer hitch constructed in accordance with the present invention.

Figure 2 is a view in vertical longitudinal section through the device.

Figure 3 is a view in longitudinal section through the forward end portion of the device, showing the inner or male member released and in partially extended position.

Figure 4 is a view in horizontal section through the forward end portion of the device.

Figure 5 is a longitudinal sectional view through the forward end portion of the device, taken substantially on the line 5—5 of Figure 4.

Figure 6 is a bottom plan view of the forward end portion of the female member.

Referring now to the drawing in detail, it will be seen that the embodiment of the invention which has been illustrated comprises an extensible bar of suitable metal which is designated generally by reference character 1. The bar 1 includes a solid inner or male member 2 which is slidable in a tubular outer or female member 3, the latter being substantially rectangular in transverse section. A clevis 4, for connection with a trailer, is welded on the rear end portion of the member 3. A clevis 5 for connection to the towing vehicle, is riveted or otherwise rigidly secured beneath the forward end portion of the member 2. A longitudinal slot 6 (see Figure 6) is provided in the forward end portion of the member 3, in the bottom thereof, and accommodates the rear end portion of the clevis 5. The member 3 is closed at its rear end, as at 7, for engagement by the corresponding end of the member 2 when the bar 1 is in fully retracted or towing position.

The member 2 further includes laterally enlarged front and rear end portions 8 and 9, respectively, providing shoulders 10 and 11, respectively. Keyhole slots 12 are provided in the sides of the member 3 adjacent the forward end thereof. The keyhole slots 12 facilitate the mounting on the assembly of pivot bolts 13. Journaled on the pivot bolts 13 for vertical swinging movement is a yoke 14 which, as illustrated to advantage in Figure 4 of the drawing, is engageable over the substantially flush forward ends of the members 2 and 3 for releasably securing the bar 1 in retracted or towing position. A spring 15 on the forward end portion of the member 3 yieldingly secures the yoke 14 in operative or latching position. When in such position it will be observed that the yoke 14 is engaged on the clevis 5.

It is thought that the manner in which the device functions will be readily apparent from a consideration of the foregoing. The bar 1 is connected to the trailer through the medium of the clevis 4 and the towing vehicle is maneuvered to a position which is approximately the correct distance from said trailer. The yoke 14 is then swung upwardly against the tension of the spring 15 to permit the member 2 to be extended, as suggested in Figure 3 of the drawing. In this manner the clevis 5 may be readily connected to the towing vehicle. The towing vehicle is then backed for telescoping the member 2 into the member 3 until the rear end of said member 2 strikes the closed rear end 7 of said member 3, at which time the forward ends of said members 2 and 3 are substantially flush. The yoke 14, which has been riding on the member 2, then drops downwardly to locking position over the flush forward ends of the members 2 and 3 for securing the bar 1 in towing position. The heads of the bolts 13 function as guides for the member 2 as said member is moved forwardly and rearwardly in the member 3.

It is believed that the many advantages of a trailer hitch constructed in accordance with the present invention will be readily understood and although a preferred embodiment of the device is as illustrated and described, it is to be understood that changes in the details of construction and in the combination and arrangement of parts

What is claimed is:

1. A trailer hitch comprising a longitudinally extensible and retractable bar including telescopically connected male and female members, the female member being non-circular in cross-section and the male member non-rotatable therein, clevises on the opposite outer end portions of said members, the female member having longitudinal slots in opposite sides and adjacent one end portion, bolts mounted in the slots, and a yoke journaled on the bolts externally of the female member and engageable over the adjacent end of the male member for releasably securing the members in retracted position.

2. A trailer hitch of the character described comprising a longitudinally adjustable bar including telescopically connected male and female members, clevises on the outer end portions of said members, the male member including enlarged end portions, the female member having longitudinal keyhole slots in one end portion thereof, headed bolts mounted in the slots, the heads of said bolts being positioned within the female member and constituting guides for the male member, and a yoke pivotally mounted on the bolts and engageable over the adjacent end of the male member for releasably securing the bar in unextended position.

3. A trailer hitch comprising a bar including an outer tubular female member and a male member fitted telescopically movable in said female member, the outer ends of said members respectively having clevises thereon, the inner end of the female member being squared off transversely thereof and the outer end of said male member being squared off and producing a transverse shoulder thereon, the shoulder on the male member being coincident and flush with the squared end of the female member in the retracted relative positions of the members, and a right angular substantially U-shaped yoke pivotally mounted on the opposite sides of the inner end portion of said female member and swingable crosswise of said squared end of said female member and positionable into and out of retentive engagement with said shoulder on the adjacent end portion of said male member and in its closed position being adapted to releasably secure the members in a normally retracted relative position of the male member in the female member.

4. A trailer hitch in the coordinated and cooperative parts in the combination and arrangement as set forth in claim 3, wherein a spring element is provided on said female member in cooperative relation to and normally urging said yoke into and yieldably holding it in its closed retentive relation to the squared end of the male member.

HAROLD R. FORNEY.

REFERENCES CITED

The following references are of record in the file of this patent:

UNITED STATES PATENTS

| Number | Name | Date |
| --- | --- | --- |
| 1,435,064 | Holmes | Nov. 7, 1922 |
| 2,179,439 | Trow | Nov. 7, 1939 |
| 1,296,105 | Navratil | Mar. 4, 1919 |
| 1,178,857 | Kirner | Apr. 11, 1916 |
| 1,462,103 | Erickson | July 17, 1923 |